United States Patent
Evans et al.

(10) Patent No.: US 9,342,503 B1
(45) Date of Patent: May 17, 2016

(54) CORRELATION ACROSS LANGUAGES

(71) Applicant: Amazon Technologies, Inc., Reno, NV (US)

(72) Inventors: David Kirk Evans, Tokyo (JP); Dong Yang, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 306 days.

(21) Appl. No.: 13/797,770

(22) Filed: Mar. 12, 2013

(51) Int. Cl.
*G06F 17/28* (2006.01)
*G06F 17/30* (2006.01)
*G06F 9/44* (2006.01)
*G06F 17/27* (2006.01)

(52) U.S. Cl.
CPC ............ *G06F 17/28* (2013.01); *G06F 17/2827* (2013.01); *G06F 17/2845* (2013.01); *G06F 9/4448* (2013.01); *G06F 17/278* (2013.01); *G06F 17/2854* (2013.01); *G06F 17/2863* (2013.01); *G06F 17/3066* (2013.01)

(58) Field of Classification Search
CPC .............. G06F 9/4448; G06F 17/3066; G06F 17/30669; G06F 17/2827; G06F 17/2836; G06F 17/2845; G06F 17/2854; G06F 17/2863; G06F 17/289; G06F 17/278
See application file for complete search history.

(56) References Cited

U.S. PATENT DOCUMENTS

| | | | | |
|---|---|---|---|---|
| 5,270,927 A | * | 12/1993 | Sproat | G06F 17/2863 715/264 |
| 5,751,957 A | * | 5/1998 | Hiroya et al. | 709/203 |
| 5,859,972 A | * | 1/1999 | Subramaniam et al. | 709/203 |
| 6,061,646 A | * | 5/2000 | Martino et al. | 704/3 |
| 6,092,036 A | * | 7/2000 | Hamann | 704/8 |
| 6,119,078 A | * | 9/2000 | Kobayakawa et al. | 704/3 |
| 6,263,335 B1 | * | 7/2001 | Paik | G06F 17/30707 |
| 7,031,911 B2 | * | 4/2006 | Zhou | G06F 17/274 704/10 |
| 7,080,320 B2 | * | 7/2006 | Ono | G06F 17/289 704/10 |
| 7,831,559 B1 | * | 11/2010 | Mohan | G06F 17/3061 707/638 |
| 7,835,903 B2 | * | 11/2010 | Datta | 704/9 |
| 8,131,536 B2 | * | 3/2012 | Weischedel | G06F 17/2229 704/2 |
| 8,296,123 B2 | * | 10/2012 | Thayer et al. | 704/2 |
| 8,843,360 B1 | * | 9/2014 | Johnston et al. | 704/8 |
| 8,990,068 B2 | * | 3/2015 | Orsini | G06F 17/2854 704/2 |
| 2005/0102259 A1 | * | 5/2005 | Kapur | G06F 17/30867 |
| 2007/0136470 A1 | * | 6/2007 | Chikkareddy et al. | 709/226 |
| 2008/0221866 A1 | * | 9/2008 | Katragadda et al. | 704/8 |
| 2010/0185670 A1 | * | 7/2010 | Krishnan et al. | 707/776 |
| 2013/0197896 A1 | * | 8/2013 | Chalabi et al. | 704/2 |

(Continued)

OTHER PUBLICATIONS

See Fung et al., "Aligning noisy parallel corpora across language groups: Word pair feature matching by dynamic time warping", in AMTA-94, Association for Machine Translation in the Americas, p. 81-88, Oct. 1994.*

(Continued)

*Primary Examiner* — Richard Zhu
(74) *Attorney, Agent, or Firm* — Thorpe North & Western, LLP

(57) ABSTRACT

Proper nouns may be correlated across languages by identifying a proper noun term in a first language and identifying a translation associated with the proper noun term, when available. A determination may be made as to whether one or more data stores associates the proper noun term with the translation, and the translation may be correlated with the proper noun term based on the determination.

25 Claims, 10 Drawing Sheets

(56) References Cited

U.S. PATENT DOCUMENTS

2014/0163952 A1* 6/2014 Brawer et al. .................. 704/5
2014/0229154 A1* 8/2014 Leydon ............... G06F 17/2836
                                                      704/2

OTHER PUBLICATIONS

Fung, "A Pattern Matching Method for Finding Noun and Proper Noun Translations from Noisy Parallel Corpora", Proceedings, 33rd Annual Meeting of the Association for Computational Linguistics, p. 236-243, 1995.*

* cited by examiner

CORRELATION ACROSS LANGUAGES

BACKGROUND

Customers are increasingly turning to electronic shopping options for purchasing products or services of interest. As the number of customers shopping via the internet increases, retailers often strive to provide a larger, more comprehensive inventory to better accommodate customers. For larger retailers, customers from around the world may access an electronic page or the like for purchasing products. Also, the retailer may provide different products for sale in various markets using multiple languages or may make available at least a subset of products which are searchable in the native language of the customer searching for the products.

Retailers may attempt to present products available from various markets in a seamless manner such that regardless of the market from which a search for products originates, optimal search results may be presented in the language of the customer. Despite improvements in searching capabilities and cross-language platforms, searching for products across languages may be ineffective or result in less accurate search results than a search with a product origination and result in a same language.

DETAILED DESCRIPTION

A technology may be provided for correlating proper nouns across languages. Proper nouns may be correlated by identifying a proper noun term in a first language from a proper noun term data store and identifying a translation associated with the proper noun term, when available. For example, when a translation of a music artist name is unavailable, an appropriate translation may be searched for in a music artist data store or a transliteration may be rendered. The translation may be a translation of the proper noun term in the first language into a second language. A determination may be made as to whether a proper noun term data store (e.g., a music artist data store) or another suitable data store associates the proper noun term with the translation, and the translation may be correlated with the proper noun term based on the determination.

As an example implementation, a Japanese marketplace may offer music products for American artists (with names written in English), but there may be limited Japanese data for the artist. Some artist name translations or transliterations may be available with a search in available data stores. For example, available artist data stores, product data stores, encyclopedic data stores or other suitable data stores may have a translation readily available. When the translations are unavailable, the artist name may be transliterated. The transliteration may be verified using a dynamic time warping evaluation approach described later to select a transliteration from multiple transliteration candidates. The identified translations or transliterations may be added to product data for correlating the Japanese translations with the American artist information in the Japanese marketplace such that searches for the translations may return the products for the American artists.

An electronic retailer may maintain marketplaces in many countries and also in many languages. Some marketplaces may use a language with a writing system that is substantially different than languages based on a Roman or Latin alphabet. Japanese, Chinese, Korean, Arabic and Russian are some non-limiting examples of such writing systems. For languages that use these different writing systems, additional complexities in searching for products may be present, particularly when the search is for a proper noun, such as the name of a music artist or author, the title of a book, movie, game or song, for example. The present technology may enable users to search for products based on the language in the country of origin (such as English for music from American musicians) or in their own language (such as in Japanese katakana characters, for example, which is a phonetic writing system used for loan words, or rather words which are borrowed from other languages instead of using native words). Enabling users to search for products in one language and discover products in another language may enhance user satisfaction and loyalty.

Figure 1:
FIG. 1 is an illustration of a search results page for searching for a proper noun across languages in accordance with an example of the present technology.

Referring to FIG. 1, a search results page 105 for an electronic retailer is illustrated in accordance with an example of the present technology. The page 105 may include various useful sections, such as, for accessing a user account 110, entering or editing a search query in a search field 130, filtering search results 140 by department 115, sorting search results 140 by price 145 or any of a number of other characteristics, accessing a shopping cart 135 for purchasing products and so forth.

In this example, a user may have entered a search query in a language other than English for a proper noun. In this example, the search query is "チャップリン", which may be a Japanese equivalent of "Chaplin". If products for Charlie Chaplin are available in English but not in Japanese, then conventional search technologies may return zero results for the "チャップリン" search query. However, an assumption that a user may not desire products available in a language other than the user's native language may be incorrect. For example, Michael Jackson attained significant notoriety in Japan for his music. Users searching for Michael Jackson music may wish to actually hear Michael Jackson sing his own songs in the language in which he sang them rather than to hear a cover of Michael Jackson's songs in the native language of the user. There may be any number of other reasons why a user may be interested in products advertised in a language other than the native language of the user, including: a lack of product availability in the user's country, a desire to use the product as a language study aid, the irrelevance of the language in which the product is advertised to the use of the product and so forth.

The present disclosure makes reference to "proper nouns" and "proper noun terms". It is noted that a "proper noun term" may include multiple terms, such as a phrase or other grouping of words or terms. As used herein, a "proper noun" or "proper noun term" may be considered to be substantially synonymous and may be used refer to a noun that refers to a unique entity. "New York City", "Michael Jackson", "Charlie Chaplin", "Google" and so forth are examples or proper nouns. Proper nouns are contrasted with or distinguished from common nouns which may refer to a class of entities. "City", "pop star", "comedian" and "corporation" are examples of common nouns which may generically represent the proper nouns mentioned above, but which do not identify a specific or unique entity. Proper nouns may occur in a plural form (e.g., the "Everglades"), as a modifying noun (e.g., "Arctic adventure"), or in a role of a common noun (e.g., that basketball player is no Michael Jordan). It is noted that while proper nouns and proper names are sometimes distinguished linguistically, proper nouns as used herein include proper names, including single- and multi-word proper names. Some examples of proper names may include Peter, Africa, Peter the Great and South Africa. Additionally, while at least some brand names and other commercial terms may comprise common nouns which may be capitalized, such brand names and commercial terms may also be included in the definition of "proper noun" as used herein.

Figure 2:
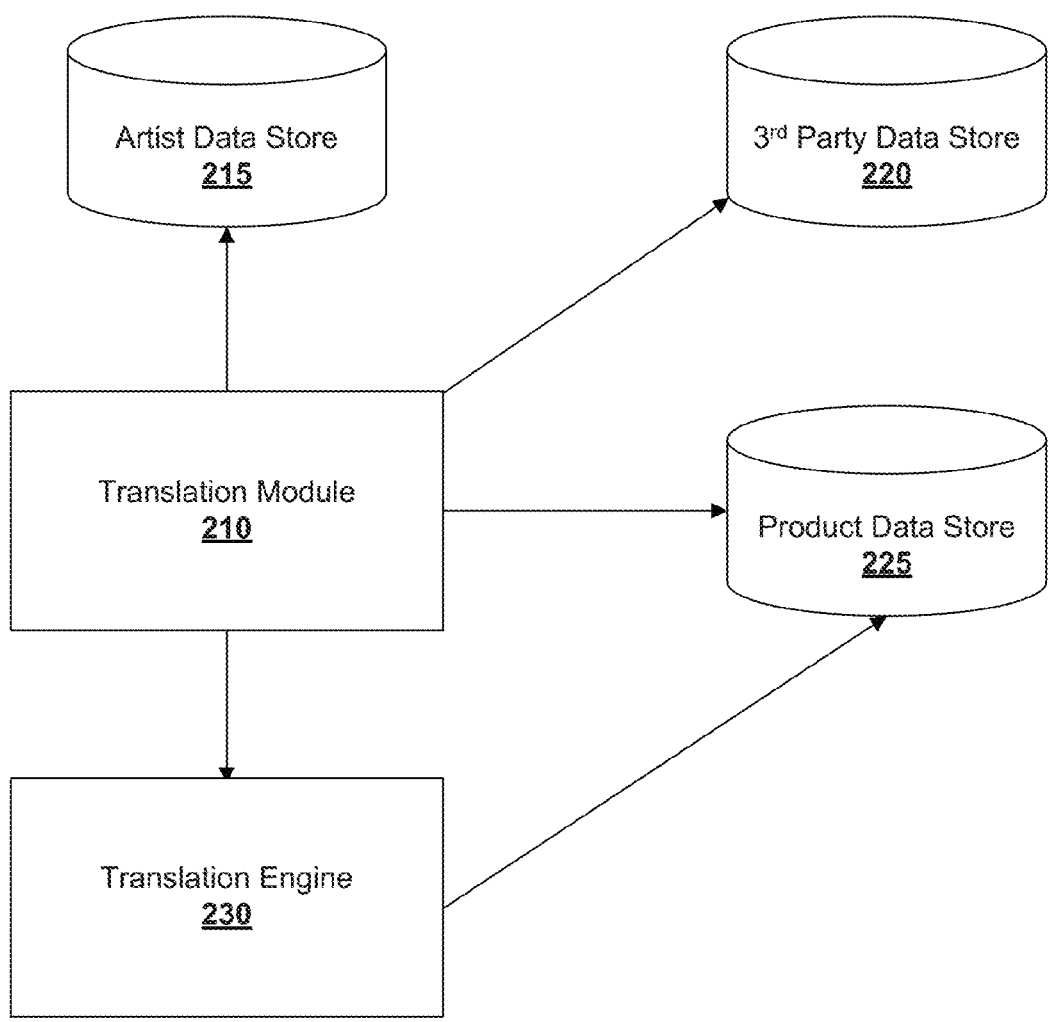
FIG. 2 is a block diagram of a system for correlating proper nouns across languages in accordance with an example of the present technology.

Reference will now be made to the system illustrated in FIG. 2. The present technology may enable users to search for products in one language and view search results in another language by identifying appropriate translations and/or transliterations of the search results in advance of the search to correlate the search query entered by the user with the products being searched. In one example, a proper noun term to be correlated across a plurality of languages may be identified from a proper noun term data store. For example, a data store 215 of authors, artists, titles or the like may be available from which proper nouns may be identified. The retailer may select proper nouns from the data store randomly or in a desired order and compare the proper nouns to a product data store to determine whether products are being sold which are correlated to the selected proper nouns. In other words, if the proper noun is the name of a music artist, the retailer may identify or select the name from the data store and determine whether music or other products by the music artist, or products which are associated with the music artist in some way, are being sold in one or more marketplaces.

When the retailer has a product for sale which may be associated with a selected proper noun, the retailer may determine whether a translation of the proper noun term is already available in the product data store 225 using a translation module 210. If the translation is available, a determination may be made as to whether each of the products sold by the retailer (which are associated with the proper noun) are also associated with the translation. For example, a product may be available in a Japanese marketplace and may be associated with the English and Japanese versions of the proper noun term. However, a United States (U.S.) marketplace may have the English version of the proper noun term and no other language versions with a product, then the Japanese translation of the proper noun term may be associated with or assigned to the products in the U.S. marketplace not currently associated with the Japanese translation. In addition, a linkage may be made between the Japanese version of the product and the U.S. version of the product. In other words, fields in a product data store relating to the proper noun in one language or another may be correlated to facilitate searching.

In a more specific example, an identifier (e.g., alpha-numeric value) may be used for the proper noun term and the identifier may be associated with products associated with the proper noun term to quickly and easily identify products when a search query for the proper noun term is received. If the identifier is associated with the proper noun term in multiple languages, then when a search query may be received for the proper noun term in one of the languages, products or proper noun terms for products for any of the languages may be returned in the search results.

In many instances, a translation of the proper noun term may not be available within the product data store 225. However, the proper noun term data store, or simply proper noun data store, (i.e., the artist data store 215 illustrated in FIG. 2) may have the translation available for some of the proper noun terms. Thus, if the retailer sells products associated with a selected proper noun term and a translation of the proper noun term is not currently available in the product data store 225, the proper noun term data store from which the proper noun term is selected may be analyzed to identify whether the translation is available within the proper noun term data store. When the translation is available, the translation may be associated with the appropriate products in the product data store 225, such as by associating the translation with the identification for the entity represented by the proper noun using the translation module 210.

There may be instances where the translation of the proper noun term is not available in either the product data store 225 or the proper noun term or artist data store 215. However, a third-party data store 220 may include the translation. As one example, an encyclopedic website or data store may include one or more encyclopedia entries for the selected proper noun term. A complete encyclopedia entry may include translations of the proper noun term into one or more other languages. As a specific example, a Wikipedia entry for "Michael Jackson" may include a list of other languages in which at least some information about Michael Jackson is available, and included in the information in the other languages may be a translation of the proper noun term "Michael Jackson". Machine selection of the Japanese language encyclopedia entry may indicate that "Michael Jackson" in Japanese is represented as "マイケル•ジャクソン". After identifying this translation of the name, the translation may be associated with the "Michael Jackson" identifier in the product data store such that "Michael Jackson" products available in English or Japanese marketplaces may optionally be returned to a user as search results whether the user searches for "Michael Jackson" or "マイケル•ジャクソン". In one aspect, a search suggestion may be provided to a user for a translation or transliteration of a proper noun when the user searches for the proper noun in one language and results are available in another language.

Because some data stores may be incomplete or out-of-date, for example some music artists may be missing who may have recently become known, finding a translation of a proper noun term in available or known data stores may be difficult. If users search for the proper noun term in a language other than the original language of the proper noun term, desired search results may not be found. To address this situation, proper noun terms may be translated by a translation engine 230 using any of a variety of suitable translation methodologies, at least some of which are described below. Further, the accuracy of the translation may be evaluated to determine whether the translation is an accurate representation of the original proper noun term. When a translation is made and the translation is considered to be suitably accurate, the translation may be assigned to the appropriate proper noun term or identifier representing the proper noun term in the product data store.

While the term "translation" is commonly used in this specification, the term "translation" is not limited to the rendering of a native word in one language to a native word in another language. For example, the translation rendering may be a transliteration of a word in one language to a word in another language. Also, as used herein, "translation" may refer to a transliteration of a word in one language to a phonetic representation of the word in the same language or rather a phonetic representation of the word using the alphabetic characters of the originating language. For example, a translation of "Michael Jackson" into Japanese may be represented as "マイケル•ジャクソン" (roughly represented in Roman characters as "My-keh-roo Jacku-sohn"). A translation of "Michael Jackson" into a phonetic representation of "Michael Jackson" may appear as MY-kuhl JAK-suhn.

In many instances, the common meaning of a word or words constituting a proper noun may be unrelated to the entity to which the proper noun refers. For example, the name of the golfer "Tiger Woods" may be unrelated to a tiger animal or to a forest. Translation, as used herein, thus may refer to transliteration. Proper nouns often have a common or universal translation. As such, having an accurate translation of the proper nouns is valuable. For example, because Japanese people may recognize that "マイケル•ジャク ソン" represents "Michael Jackson", use of "ミーカエル•ジェックスン" (Mee-kae-ru Jekk-suhn) or some other variant transliteration that deviates from the known and accepted transliteration may be less effective for returning appropriate search results when a user is searching for "Michael Jackson" products. When the known and accepted translation of a proper noun may be found in an available database, the transliteration may be accepted as suitable. However, it is apparent that accurate transliteration when a known translation is unavailable is valuable. Thus, an accuracy of transliterations may be evaluated as will be described later.

While the present technology is described largely in terms of translation between any one language and any other language, the technology may be well suited for translation between languages not based on a same alphabet. For example, Japanese, Korean, Arabic, Russian, Chinese and other languages use alphabets or writing systems other than the Roman alphabet and benefit particularly from transliterations of Roman-alphabet-based proper nouns.

It is noted that while the present technology is presented in the context of electronic retail applications, the technology may be applied to virtually any other suitable context where translations of proper nouns is desirable. For example, the technology may be applied to general search engines, social networking translation or translation of communication messages (e.g., email, instant messaging, forum posting messages, etc.). Furthermore, because the context of many of the described examples relates to retail, retail products are described. Products may refer to items, goods, or services available in exchange for something of value. However, because the technology may be applied to contexts other than retail, application is not limited to products and may be applied to virtually anything identified by a proper noun and which is referenced electronically.

Whereas the foregoing discussion references proper nouns for display on a network page for a product, the proper nouns may be available in any format associated with any type of network resource. For example, a resource may include a page, a video clip, an audio clip, an image, an e-book, a text document, an application page, any other suitable type or configuration of resource which may be used to present a proper noun, an object or an entity associated with a proper noun to a user.

Figure 3:
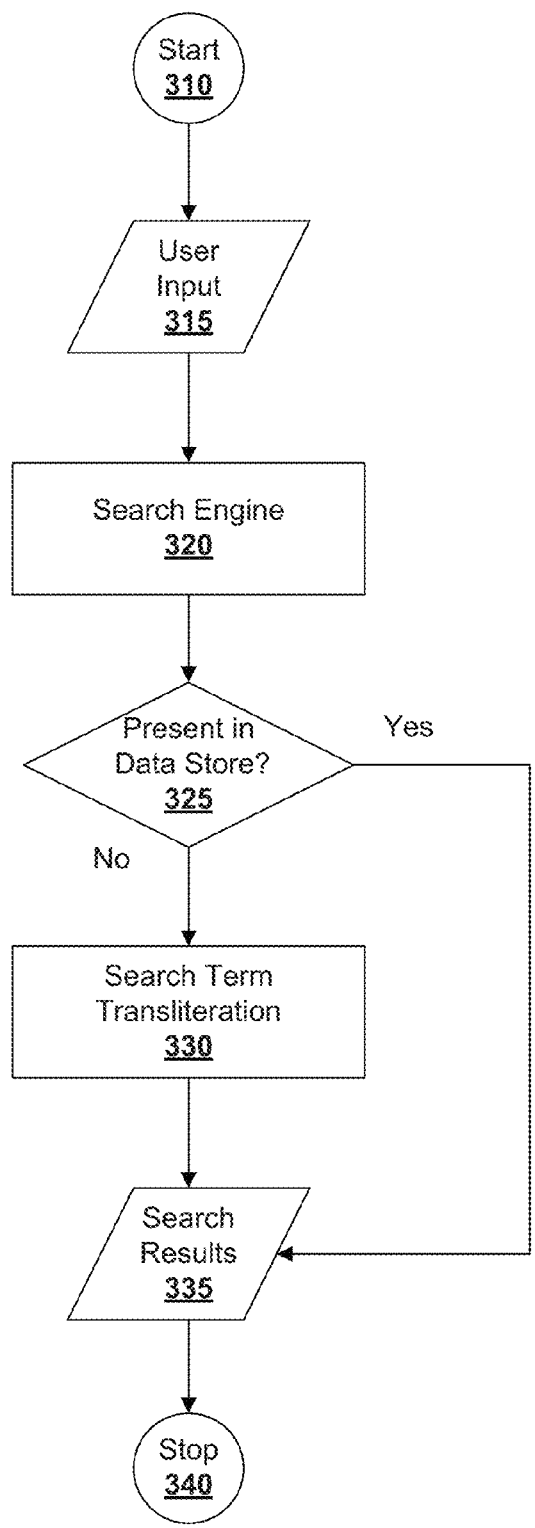
FIG. 3 is a flow chart of a user-initiated search, where search terms are transliterated to obtain search results in accordance with an example of the present technology.

Referring to FIG. 3, a flow chart is provided which illustrates an example implementation of the present technology for identifying search results relative to a search query. The flow begins at 310 and a user input 315 may be received. The user input 315 may be a search query term or phrase entered into a search field. A search engine 320 may parse and execute the query to identify relevant search results. If the user input matches one or more items indexed by the search engine, then the one or more items may be returned to the user as search results 335 where the flow may end or stop 340. When the user input used to perform the query and at least one result from the search results are in different languages, the result may be identified for inclusion in the search results according to a correlation of proper nouns as has been described previously.

In some cases, a search query may be received for a proper noun which has not been identified or correlated with any items, at least in the language or alphabet in which the search query is input. In other words, no search results may be returned for the foreign language query (as compared to the language of the originating page). In such examples, the terms in the search query may not be present in a product data store, as determined at 325, but returning a useful result to the user may yet be desirable. If the searched for term(s) may not be present in the data store, then the search term(s) may be transliterated, as in operation 330. Transliteration of search terms may be performed in advance of receipt of a search query, such as at build-time of the search engine index, or alternately may be performed at run-time when the search query is received. Various potential search terms may be transliterated in advance for use with the present technology and any suitable combination of transliterations may be used together to form a full transliteration of a search query, such as when the search query includes a plurality of words. Run-time transliteration may be more computationally expensive than build-time transliteration, but may enable return of search results for non-indexed or non-processed search queries and transliterations. In some examples, transliterations may be provided at build-time which are intended to address a majority of search queries to be received, and run-time transliteration may be enabled to address search queries not addressed by the build-time pre-processed transliterations. Such an implementation may facilitate or improve out-of-vocabulary transliterations and searches.

Because the universal or commonly accepted transliteration may not be precisely known and further because transliterations do not represent an ideal representation in a second language of a term in a first language, transliteration to a phonetic representation of the user input may be desirable. To identify products relevant to the phonetic representation of the user input, a retailer may transliterate known proper nouns into phonetic representations in advance of the search and such phonetic representations may then be compared the phonetic representation of the user input. When the phonetic representations of the proper nouns and the user input (which may also be a proper noun) are sufficiently similar, the search results for the proper noun may be included in the search results of the user. In some examples, similarity between a proper noun pronunciation and a phonetic approximation of the proper noun in another language may be determined at least partially according to comparison rules. Even phonetic transliterations of terms in different languages may not align exactly and the comparison rules may assist in determining whether the phonetic representation of the user input sufficiently matches the phonetic representation of the proper noun.

As mentioned previously, "マイケル・ジャクソン" may be roughly phonetically represented in Roman characters as "My-keh-roo Jacku-sohn" while "Michael Jackson" may be phonetically represented as "MY-kuhl JAK-suhn". In Japanese, the phonetic sounds "e-ru" or "e-roo" in foreign or loan words written in the katakana alphabet may approximate the sound of the English letter "L", particularly when these sounds appear at the end of a word. Thus, the comparison rules may attempt to find a similar match to "My-keh-roo" by substituting "eh-roo" with "L" or "uhl". With this substitution, "My-keh-roo" approximately becomes "My-kuhl" which matches the phonetic representation of "Michael". Any of a number of linguistic rules may be applied to determine whether there is a match for the user input and the indexed data. Some languages, such as Japanese, for example, may enable straight-forward phonetic characterization of terms because the alphabet and pronunciation of the alphabet or words based on the alphabet are substantially phonetically based. Other languages, such as English, for example, may be less straight-forward in terms of phonetically representing a word or phrase based solely on spelling and may rely more heavily on linguistic rules for appropriate phonetic characterization.

Figure 4:
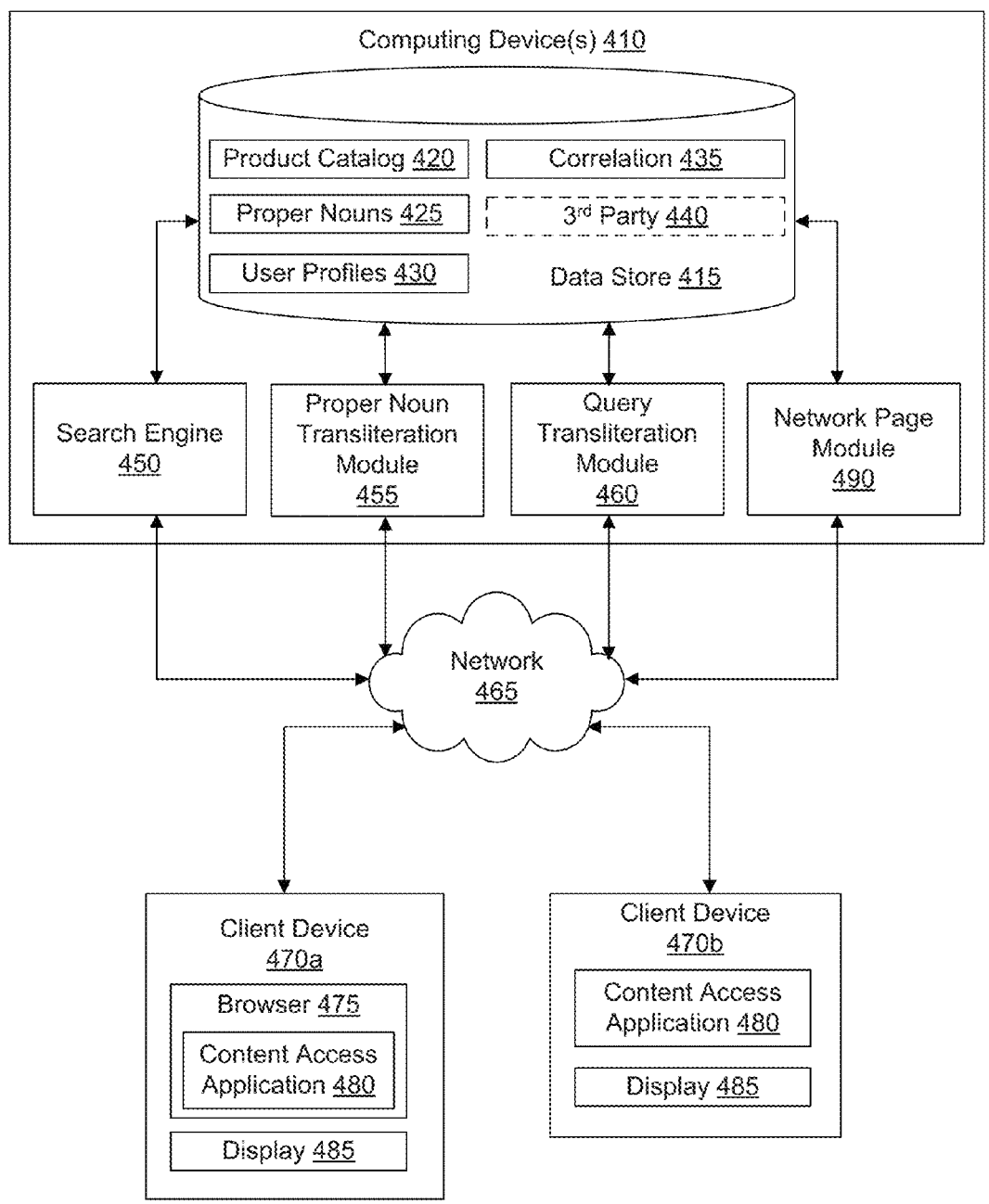
FIG. 4 is a block diagram of a system for correlating proper nouns across languages in accordance with an example of the present technology.

Referring to FIG. 4, a block diagram of a system for correlating proper nouns across languages is illustrated in accordance with an example of the present technology. The proper noun correlation may be used in retail search engines, general search engines, social networking, electronic messaging and other areas where transliterations are desired. The system may be implemented across one or more computing device(s) 410, 470a, 470b connected via a network 465. For example, a computing device 410 may include a data store 415 and various engines and/or modules such as a search engine 450, a proper noun transliteration module 455, a query transliteration module 460 and a network page module 490, which may be executable by a processor of the computing device 410. The data store 415 may include multiple data stores for storing a product catalog 420, proper noun data 425, correlation data 435, third party data 440 and user profile data 430. The data store 415 may also include other data stores for storing other suitable data, as will be apparent from the present description.

The system may be configured to process search requests for products or items across languages in response to receipt of a search query from a client device 470a, 470b. For example, the search engine 450 may parse and execute user input submitted as a search query via the network 465 to return suitable indexed results matching the user input. For example, the search engine 450 may compare the user input with items in the product catalog 420 or with data in the correlation data store 435 in an attempt to discover a match for the user input. The correlation data store 435 may store translations or transliterations of proper nouns referenced in the product catalog 420 such that when a search is requested, results from the product catalog in one or more languages may be retrieved as a result of correlation via the correlation data store.

In addition to being used for returning results for user search queries, the search engine 450 may also be used to search proper noun data stores 425, product catalog data stores 420, third-party data stores 440 or any other suitable data store to discover proper nouns to be translated. The search engine 450 may also search for the appropriate or correct translation of the proper noun to a given language from an original language, as has been described, such as by searching the product data store, a proper noun data store, an encyclopedic data store and so forth.

The proper noun transliteration module 455 may be used to transliterate proper nouns from an original language into one or more other languages, phonetically or otherwise. For example, a proper noun may be translated to a best-fit phonetic representation of the proper noun in a target language. However, such a best-fit phonetic representation may not universally represent a best representation. For example, in Mandarin Chinese, characters commonly used to represent foreign words may be limited to a relatively small subset of a total number of available characters and these characters may not encompass every available sound in other languages or represent how certain sounds are commonly transliterated. For example, considering McDonald's restaurant, rather than using a translation with a strict phonetic representation, McDonald's is translated as "麦当劳" (or "màidàngláo" in pinyin). The translation/transliteration generated by the transliteration module 455 may be used, for example, when a translation is not ready available in known or trusted data stores.

The search engine 450 and the proper noun transliteration module 455 may be used on a regular basis to maintain updated correlation data in the correlation data store 435. For example, the search engine 450 may perform daily, weekly or monthly queries to the proper noun data store 425 to search for previously un-correlated proper nouns, to check whether previously unavailable translations of proper nouns have been added to the proper noun data store, to search for product or brand names which may include proper nouns but for which language correlation data is unavailable and so forth. The periodic queries to the proper noun data store 425 may also be performed at any other suitable intervals of time.

Where the proper noun transliteration module 455 has been used to transliterate a proper noun when a transliteration was not previously discovered in the product catalog 420, proper noun data store 425, third-party data store 440 or any other suitable data store, the search engine 450 may perform subsequent periodic searching to find accepted transliterations of the proper noun to potentially replace the transliteration from the proper noun transliteration module 455, where the transliteration differs from the accepted transliteration subsequently discovered by the search engine 450. Translations or transliterations of proper nouns are not likely to vary once an accepted transliteration is reached by a population of language speakers. However, to ensure accuracy of data in the correlation data store 435, the search engine 450 may periodically compare transliterations in the correlation data store 435 with transliterations in the proper noun data store 425, third-party data store 440 or any other suitable data store. The periodicity of this comparison of known transliterations may be longer or greater than the more frequent queries for unknown transliterations or for transliterations of unknown quality.

In one example implementation, the search engine 450 may query the proper noun data store 425 for proper nouns. For example, a music artist data warehouse may have proper nouns, such as names of music artists, names of albums, names of sounds, names of bands and so forth. The proper noun data store 425 may be an internal data store maintained by the retailer but separate from a product data store for one or more markets or marketplaces. Alternatively, the proper noun data store 425 may be an external data store maintained by a third party, such as a third party music or book entity.

As has been described previously, artist names and the like may be assigned a unique identifier, such as a code or number or the like. The proper noun data store 425 may store these identifiers for various proper nouns. For example, the search engine 450 may be used to query the identifier for the proper noun in the product catalog 420 for the US marketplace to obtain an accepted English name of an artist, and may also query a product catalog for the Japanese marketplace using the identifier to obtain the artist name in Japanese. The English and Japanese (typically katakana) pairs may then be stored in the correlation data store 435 for use when a search query is received. While the identifier may be associated with at least some of the products associated with the Japanese version of the proper noun and separately with at least some of the products associated with the English version of the proper noun, the Japanese version may not be associated with each of the individual products associated with the English version of the proper noun and the English version may not be associated with each of the individual products associated with the Japanese version of the proper noun. Thus, correlation of the English-Japanese translation pair in the correlation data store 435 may create the association such that the Japanese and English versions of the proper noun are associated with the appropriate products, regardless of language. In other words, through the correlation of the associated representations of the proper noun in the two or more languages, searches for the proper noun in one of the languages may return results for products associated with that proper noun in another language.

The searching for proper noun pairs may be an automated process which may search for pairs across any number of sources. Some sources may be more reliable than others and thus a translation found at a first source may be accepted over a translation from a second source if the first source may be considered more reliable or trustworthy than the second source.

Reliability of the source may play a part in accurately transliterating proper nouns between languages when a known transliteration is unavailable. Using English and Japanese as an example, a simple rule-based system may be used for transliterating English names into Japanese using common replacements that native Japanese speakers use to write an English name in katakana. Simple rule based systems may give marginally satisfactory results. The results may be at least somewhat improved if analysis of transliterations from highly reliable and trusted sources is performed as a basis for similar transliterations of proper nouns with unknown transliterations.

In one configuration, the proper noun transliteration module 455 may include a statistical system that transliterates from one language to another. One example system may involve a cascade of weighted finite transducers. A finite-state transducer is a finite automaton whose state transitions are labeled with both input and output symbols. A path through the transducer encodes a mapping from an input symbol sequence to an output symbol sequence. A weighted transducer puts weights on transitions in addition to the input and output symbols. Weights may encode probabilities, durations, penalties, or any other quantity that accumulates along paths to compute the overall weight of mapping an input sequence to an output sequence. For example, a word or phrase to be transliterated may be processed through a weighted finite transducer.

Other statistical approaches may also be used in the proper noun transliteration module 455, including, but not limited to, conditional random fields, Markov chains, expectation maximization, Bayesian probability modeling and so forth. Statistical approaches may be more effectively implemented when highly reliable data is available for "training" a model. Certain data stores, topical corpa, technical corpa, academic conferences and the like may be suitable sources of highly reliable training data for statistical transliteration approaches. Transliteration approaches may also implement machine learning to learn changing transliteration methodologies, such as, for example, the use of "$" in place of the letter "S" or the substitution of numbers for letters as with leet ("1337") speak.

The system may include the query transliteration module 460 to transliterate user input or search queries. Some non-limiting examples of when to transliterate search queries may include transliterating searches where proper nouns are not found for the original user input, where a search is identified as a foreign language, or when a number of search results is fewer than a predefined number. Also, query transliteration may be performed to broaden search results regardless of a number of results without transliteration. The search query may be transliterated in a manner similar to the transliteration of the proper nouns performed by the proper noun transliteration module 455. More specifically, some non-limiting example transliteration methods may include the simple rule-based transliterations or more sophisticated statistical model transliterations.

The system may include the network page module 490 for displaying network pages, including search fields, user interfaces, transliterations, product data and any other suitable object or data for facilitating or enhancing user interaction with the electronic retailer and for searching or correlating proper nouns across languages.

The network page module 490 may access data in the product catalog data store 420 for providing search results, product information and other network page data for display on the client device 470a, 470b. The product catalog data store 420 may include, for example, the products or items available for purchase from an electronic retailer. The product catalog data store 420 may include text, images, video and so forth, and may be structured for suitable display on a client device 470a, 470b, for example, in the form of a webpage or website. The product catalog data may also include product identifications, such as alphanumeric values or the like, for unique product identification, association with product reviews, designation in purchase histories and so forth.

The user profile data 430 may include, for example, biographical information of the user (such as location, age, gender, etc.), browsing history of the user, purchase history of the user and so forth. In other words, the user profile data may include demographic information or user profile information for the user. In one aspect, the user profile data 430 may be used to improve search results. For example, if an input language of the user for a particular search query is unknown, but the user resides in Japan or has previously input search queries in Japanese, then less processing may be involved for a search engine to determine that the current search is also in Japanese because that may be the default language for the user. If a user demonstrates an interest in pop music, for example, and a large majority of searches are pop music-related, then if the user inputs "マイケル•ジョーダン" ("Michael Jordan") as a search query, an assumption may be made that the user made a poor transliteration of "Michael Jackson" since "Michael Jackson" is pop music-related and "Michael Jordan" is sports-related.

The proper noun data store 420 may be a data store for storing proper nouns and data related to the proper nouns. Additionally, the proper noun data store 420 may comprise a plurality of data stores specific to particular topics. For example, one proper noun data store may be an artist data store that includes names of artists, discography, biographical data and so forth for artists. Another proper noun data store may be an author data store that includes names of authors, titles of works authored by the authors, biographical data and so forth for the authors. Other data stores may cover other areas such as movies, videos, electronics, books, manga, vehicles, golf or other areas of user interest. In one aspect, the different types or topics of proper noun data stores may be stored in a single data store.

The correlation data store 435 may store proper noun pairs or sets for proper nouns and translations across languages. In one example, available translations for a proper noun may be associated with an individual identifier as an N-language tuple. In another example, translations may be associated directly with one another. In another example, translations may be paired or grouped and such pairs or groups may overlap or link to enable deeper correlation. For example, with the "McDonald's" proper noun, a pair may be created for "McDonald's" and "マクドナルド" for English-Japanese and another pair may be created for "McDonald's" and "麦当劳" for English-Mandarin. While Japanese is not paired with Mandarin, both Japanese and Mandarin share the English pair, so a search for the Japanese proper noun may return Mandarin search results through correlation via the English link between Japanese and Mandarin.

The third-party data store 440 may be a data store accessible by the search engine 450, but the third-party data store may be a non-local data store which may be independent of the electronic retailer. Some third-party data stores have been referenced previously and may include, for example, encyclopedic or other trusted data stores which may include at least some proper noun translations. In some examples, other data stores, such as the proper noun data store 425 for example, may also be external and/or third-party data stores. The third-party data store 440 may also be one example source of translation data for obtaining accepted translations or for training transliteration models.

The modules that have been described may be stored on, accessed by, accessed through, or executed by a computing device 410. The computing device 410 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 410 is referred to herein in the singular form. Even though the computing device 410 is referred to in the singular form, however, it is understood that a plurality of computing devices may be employed in the various arrangements described above.

Various applications and/or other functionality may be executed in the computing device 510 according to various embodiments, which applications and/or functionality may be represented at least in part by the modules that have been described. Also, various data may be stored in a data store 415 that is accessible to the computing device 410. The data store 415 may be representative of a plurality of data stores as may be appreciated. The data stored in the data store 415, for example, may be associated with the operation of the various applications and/or functional entities described. The components executed on the computing device 410 may include the modules described, as well as various other applications, services, processes, systems, engines or functionality not discussed in detail herein.

The term "data store" 415 may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The client devices 470a, 470b shown in FIG. 4 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 470a, 470b may be embodied, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device 470a, 470b may include a respective display 485. The display 485 may comprise, for example, one or more devices such as cathode ray tubes (CRTs), liquid crystal display (LCD) screens, gas plasma based flat panel displays, LCD projectors, or other types of display devices, etc.

Each client device 470a, 470b may be configured to execute various applications such as a browser 475, a respective page or content access application 480 for an online retail store and/or other applications. The browser 475 may be executed in a client device 470a, 470b, for example, to access and render network pages, such as web pages or other network content served up by the computing device 410 and/or other servers. The content access application is executed to obtain and render for display content features from the server or computing device 410, or other services and/or local storage media.

In some embodiments, the content access application 480 may correspond to code that is executed in the browser 475 or plug-ins to the browser 475. In other embodiments, the content access application 480 may correspond to a standalone application, such as a mobile application. The client device 470a, 470b may be configured to execute applications beyond those mentioned above, such as, for example, mobile applications, email applications, instant message applications and/or other applications. Users at client devices 470a, 470b may access content features through content display devices or through content access applications 480 executed in the client devices 470a, 470b.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Using a transliteration system, such as the rule based or statistical systems described previously with regard to FIG. 4, transliterations between languages may be generated. For example, Japanese writing transliterations may be generated for names of English artists. However, as has been described previously, transliteration may be an imperfect science. Therefore, a system may be configured such that the proper noun transliteration module 455 may rank transliterations.

Figure 5:
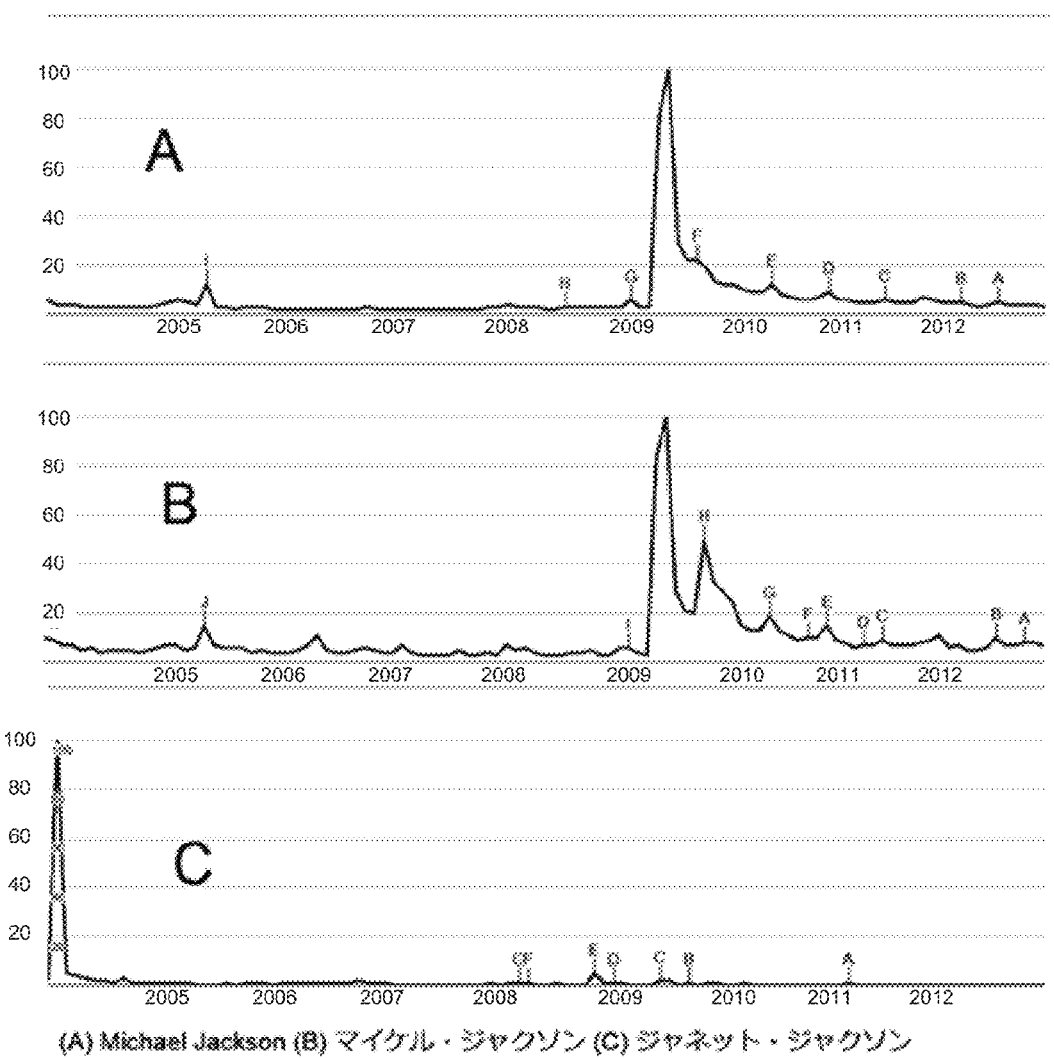
FIG. 5 includes charts illustrating search volume for various search terms for use in validating accuracy of a transliteration in accordance with an example of the present technology.

Reference will now be made to FIG. 5. In the context of electronic retailing, and more particularly in the context of a multi-national electronic retailer, search behavior from users in different regions may be available for analysis to validate and score good candidate transliteration pairs. One example method of validating candidate transliteration pairs is to use dynamic time warping over a search frequency of each term. As an example, "Michael Jackson" may be transliterated into Japanese as "マイケル•ジャクソン". In this example, the U.S. marketplace and the Japanese marketplace may each have products available for "Michael Jackson" and "マイケル•ジャクソン", respectively, but a correlation between the two is unknown. In other words, searches for "Michael Jackson" may not return results for "マイケル•ジャクソン" and searches for "マイケル•ジャクソン" may not return results for "Michael Jackson". However, there may be a suspected correlation between the two search phrases. With the "マイケル•ジャクソン", an analysis may be performed to determine when and how frequently "マイケル•ジャクソン" was searched. This may be compared against "Michael Jackson" searches in the U.S. While an absolute number of searches for a particular term or phrase may differ between markets, a relative search volume may be comparable. For example, using a high volume of searches as 100% volume, a scale may be established for other volumes of searches and charts similar to those shown in FIG. 5 may be created.

For at least some artists or proper nouns, peaks in interest in the artist may be similar across regions as compared to time. Such peaks in interest may be reflected in search volume and may follow releases of new albums or other significant events. For example, searches for "Michael Jackson" (A) or "マイケル•ジャクソン" (B) peaked in mid-2009 and followed a somewhat similar decline in interest over time. Mid-2009 is when Michael Jackson passed away, which may be a source of the spike in interest. The spike in interest or the similarity between the search volumes for "Michael Jackson" and "マイケル•ジャクソン" correlate strongly enough that an assumption may be made that these proper nouns are related. While trends may be delayed at times (such as a few weeks for a new movie to be released overseas after a U.S. release, for example) general search behavior may be sufficiently similar to identify good matches between candidate terms.

The dynamic time warping charts in FIG. 5 further illustrate a search on Google Trends for (A) "Michael Jackson", (B) "マイケル•ジャクソン" (Michael Jackson), and (C) "マイケル•ジャクソン" (Janet Jackson in Japanese). The Janet Jackson transliteration may be a poor transliteration for "Michael Jackson", but in contrast, other closer bad translations (e.g., "Meechael Jackson", etc.) failed to return any search results. The lack of search results may be positive evidence of a bad transliteration. While the Janet Jackson transliteration did return some results, the peak in interest for Janet Jackson was in 2004, around the time of Janet Jackson's performance in the SuperBowl football half-time show. Because the interest poorly matches the interest for "Michael Jackson" and because "マイケル•ジャクソン" interest closely matches that of "Michael Jackson", an assumption may be made that the Janet Jackson transliteration is a poor and inaccurate transliteration for "Michael Jackson" and that "マイケル•ジャクソン" is an accurate and suitable transliteration. Some transliterations may be more similar than the transliterations of Michael and Janet Jackson described above, but a similar methodology may be applied to ensure accuracy of a transliteration selected for correlation with the original proper noun (which, in this example, is "Michael Jackson"). Users searching on an electronic retail site may have search queries that are relevant to a specific domain of search. The present technology may be applied for any category of search (in addition to the music and artists examples described). By narrowing the data used for dynamic time warping verification, precision in transliteration may be improved. In other words, narrowing potential search results to a specific domain, such as music artists, when the proper noun is known to refer to a music artist, may facilitate more accurate dynamic time warping verification, which may in turn ensure that the proper transliteration is identified from among multiple different potential transliterations.

In some examples, multiple potential transliteration candidates may be selected for correlation with a proper noun, particularly if a best transliteration is unclear or if there is confusion in at least a small population of users searching in the target language as to how the transliteration is spelled or otherwise characterized. Inclusion of multiple transliteration candidates for correlation with search queries may result in a trade-off between recall and precision.

In addition to verifying an accuracy of a transliteration, user search data may also be used to generate a transliteration when a transliteration is unknown, such as when the user search data is evaluated in combination with purchase data. For example, if a user inputs a search query in one language and then purchases a product in another language, an assumption may be made that an association exists between the search query and the purchased product. A strength of the association may be represented by a score. A higher score may indicate a greater degree of confidence in the association. Without further data upon which to base the association, a single search followed by the purchase may be a weak association, but may yet be used to generate search results when desired or when appropriate. Similar searches which resulted in a purchase of a same or similar product may strengthen the association or increase the score. Also, post-processing of the search query to transliterate the search query or to discover additional information about the search query may result in a stronger or weaker score or degree of confidence in the association.

Figure 6:
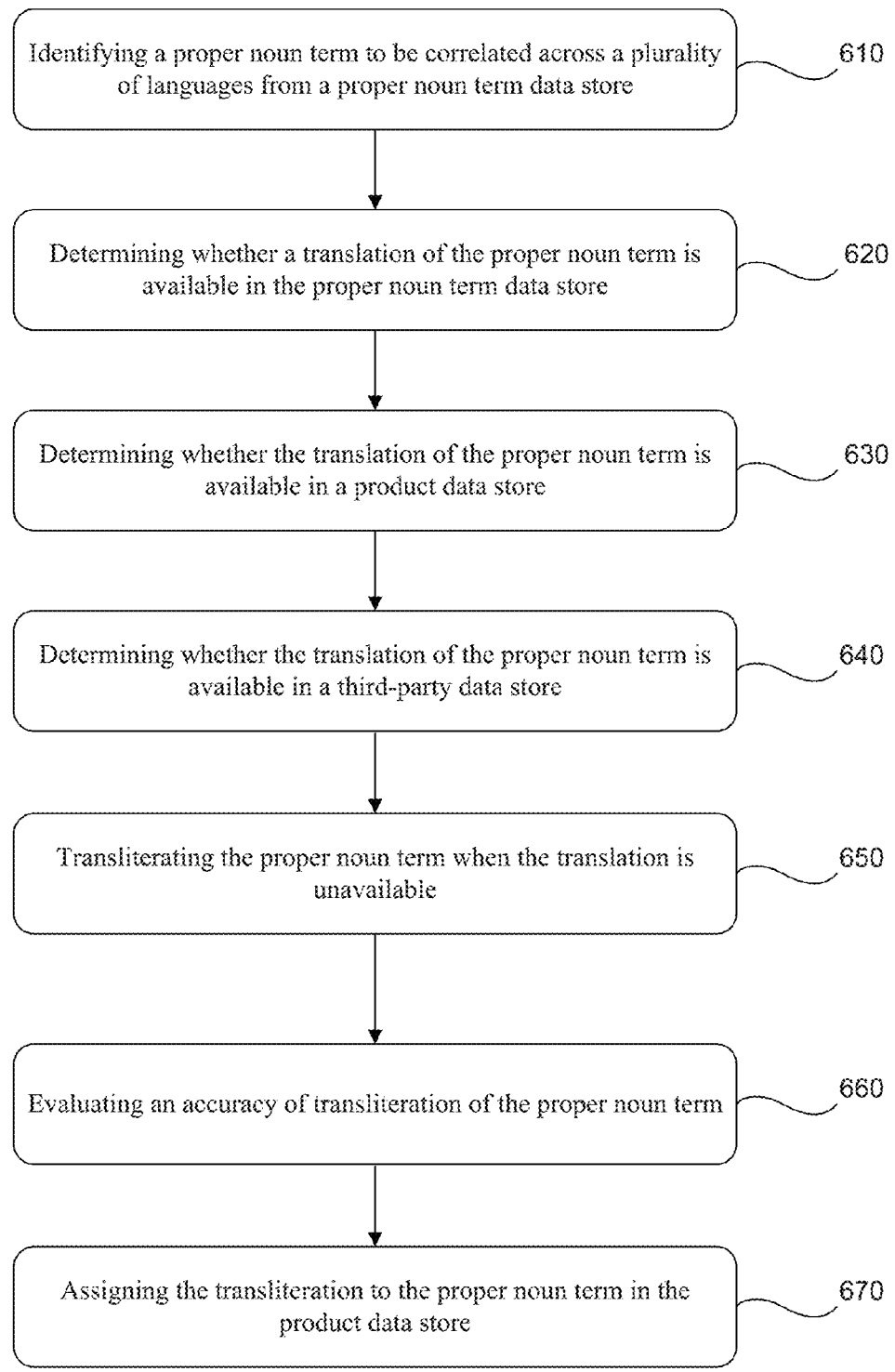
FIGS. 6-9 are flow diagrams of methods for correlating proper nouns across languages in accordance with examples of the present technology.

Referring now to FIG. 6, a flow diagram of a method for correlating proper noun terms across languages is illustrated in accordance with an example of the present technology. A proper noun term to be correlated across a plurality of languages may be identified 610 from a proper noun term data store using a processor. For example, the proper noun term may be an author name, an actor name, book title, movie title, a brand name, a product name, an artist name or any other suitable proper noun term. Various determinations 620, 630, 640 may be made as to whether a translation of the proper noun term is available in one or more data stores, such as a proper noun term data store, a product data store and a third-party data store. When a transliteration is unavailable in the data stores, the proper noun term may be transliterated 650. An accuracy of the transliteration may be evaluated 660, such as by using dynamic time warping or other suitable methods, and the transliteration may be assigned 670 to the proper noun term in the product data store when the transliteration is determined to be sufficiently accurate.

In some examples of the method, the proper noun term may be transliterated to a phonetic representation of the proper noun term, and the phonetic representation may be in the same writing language system as the original proper noun term. The phonetic representation of the proper noun term may then be transliterated into another language. In other examples, a proper noun term may be directly transliterated to another language without an intermediary step of transliterating to a phonetic representation of the proper noun term.

In some examples, a search request may be received in one of the plurality of languages for the proper noun term. Search results may be provided when available. However, results for a proper noun term in another language may be unavailable. In such examples, the search term in the search request may be transliterated from a first language to a phonetic representation of the search term for comparison to at least one of the proper noun term and the transliteration of the proper noun term in a second language, where the transliteration of the proper noun term in the second language may also be a phonetic representation. Search terms, proper noun terms and so forth may be optionally transliterated to the international phonetic alphabet (IPA) for comparison with one another.

Figure 7:
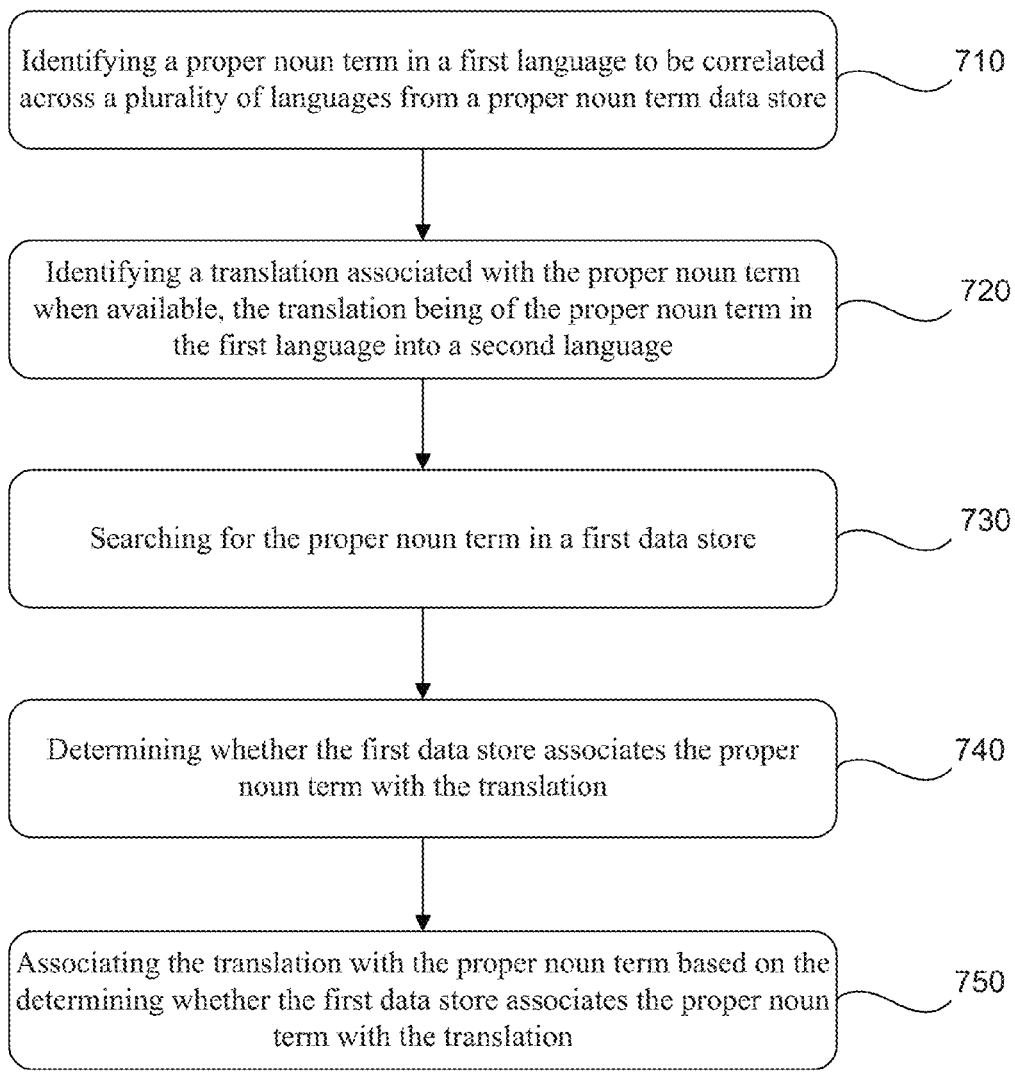

Referring to FIG. 7, a flow diagram of a method for correlating proper noun terms across languages is illustrated in accordance with an example of the present technology. Proper nouns may be correlated across languages by identifying 710 a proper noun term in a first language from a proper noun term data store and identifying 720 a translation associated with the proper noun term, when available. The translation may be a translation of the proper noun term in the first language into a second language. After searching 730 for the proper noun in a first data store, a determination 740 may be made as to whether the first data store associates the proper noun term with the translation, and the translation may be correlated or associated 750 with the proper noun term based on the determination.

In one configuration, the method step of identifying the translation associated with the proper noun term may include identifying whether the translation is available in the proper noun term data store or in a second data store. Associating the translation with the proper noun term may include associating the translation with the proper noun term in a second data store. In some examples, the first data store may be a remote, public data store and the second data store may be a local, private data store, or vice versa.

The method may include transliterating by using a statistical transliteration approach including training, comparing, evaluating, validating operations for learning and transliterating proper noun terms. In one aspect, the proper noun term may be transliterated to a phonetic representation of the proper noun term, such as in the IPA, for example, which may in turn be optionally transliterated into the second language.

Similarly search terms may be transliterated directly or phonetically, such as to the IPA, for comparison with indexed data, which may also optionally be available in a transliterated phonetic format to facilitate phonetic-based searches. Transliteration between languages via the IPA may be assistive in ensuring accurate transliterations.

In one example of the method, the translation may be one of a plurality of transliterations. Search frequencies for the plurality of transliterations may be tracked and at least one of the plurality of transliterations may be selected as the translation for use with searches based on a search frequency for one transliteration as compared with other multiple transliterations.

Figure 8:
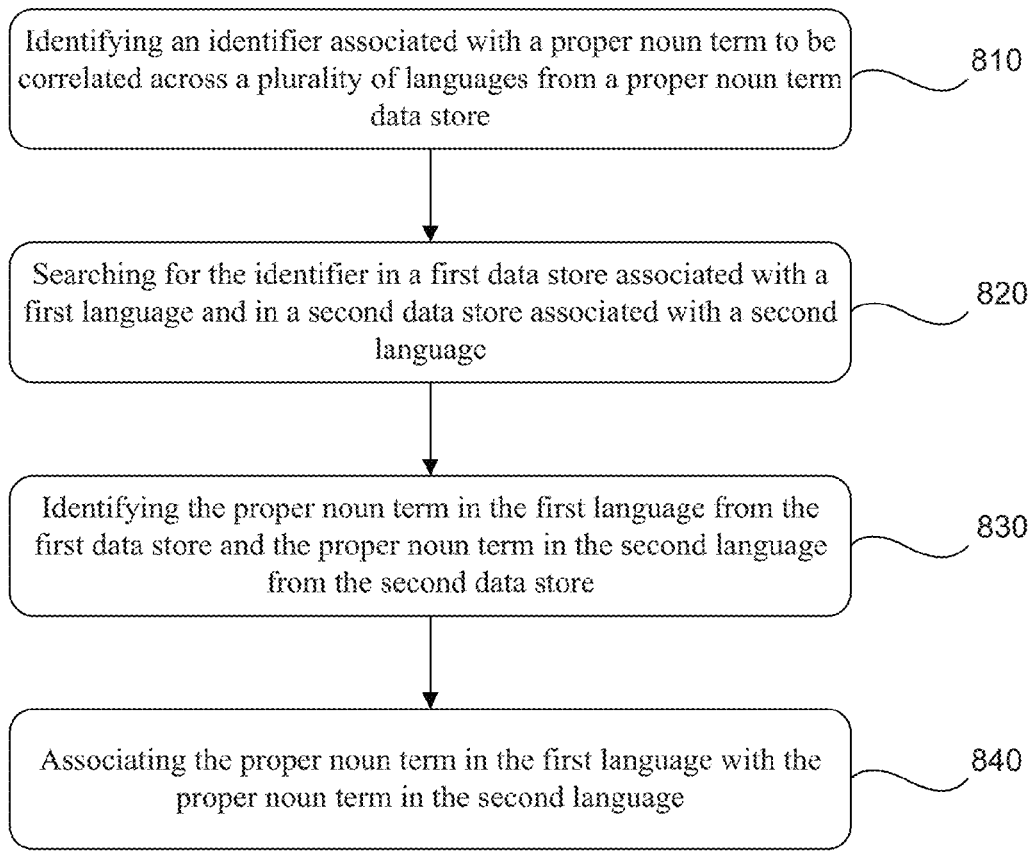

Referring to FIG. 8, a flow diagram of a method of correlating proper noun terms across languages is illustrated in accordance with an example of the present technology. The method may include identifying 810 an identifier associated with a proper noun term to be correlated across a plurality of languages from a proper noun term data store. A search 820 may be performed for the identifier in a first data store associated with a first language and in a second data store associated with a second language. For example, the first data store may be a data store for a U.S. marketplace and the second data store may be a data store for a Japanese marketplace. The identifier may be a same identifier used in both marketplaces but may reference English products in the U.S. marketplace and Japanese products in the Japanese marketplace. The proper noun term in the first language may be identified 830 from the first data store and the proper noun term in the second language may be identified from the second data store based on the common identifier. The proper noun term in the first language may then be associated 840 with the proper noun term in the second language.

Figure 9:
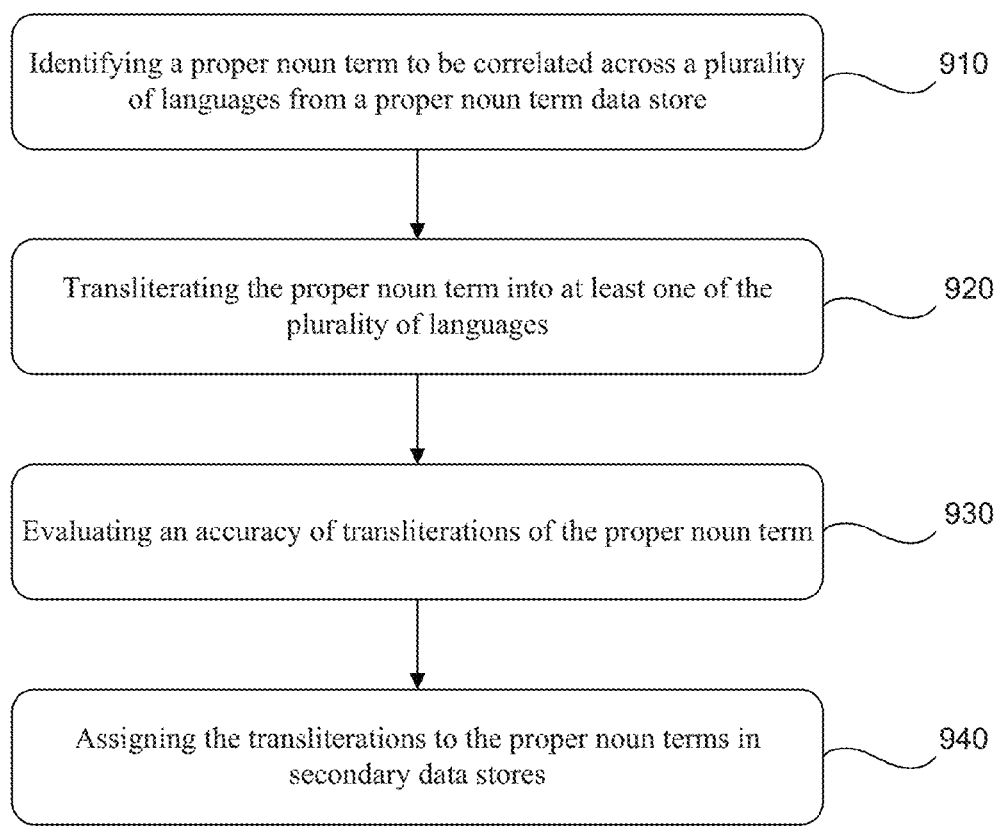

Referring to FIG. 9, a flow diagram of a method of correlating proper noun terms across languages is illustrated in accordance with another example of the present technology. The method may include identifying 910 a proper noun term to be correlated from one language to one or more other languages from a proper noun term data store. The method may further include transliterating 920 the proper noun term into at least one of the plurality of languages. An accuracy of transliterations of the proper noun term may be evaluated 930 and the transliterations may be assigned 940 to the proper noun terms in secondary data stores.

Figure 10:
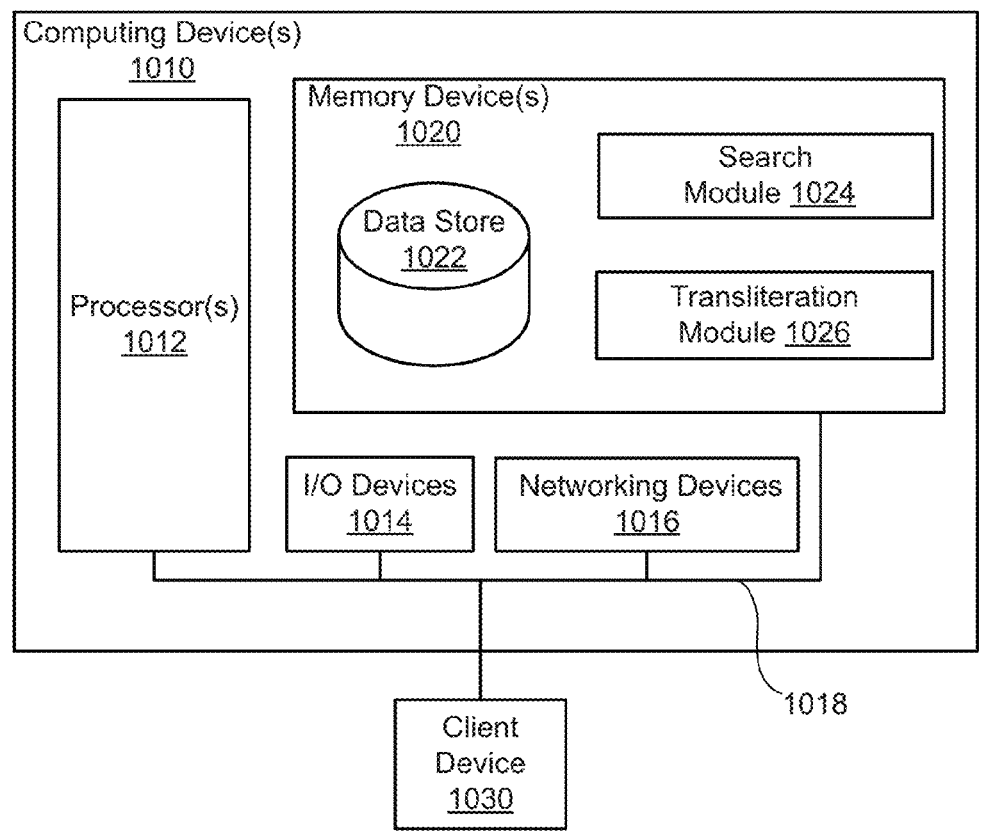
FIG. 10 is a block diagram illustrating an example of a computing device for correlating proper nouns in accordance with an example of the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules that are executable by the processor(s) and data for the modules. Located in the memory device 1020 are modules executable by the processor. For example, a search module 1024 and a transliteration module 1026, as well as other modules, may be located in the memory device 1020. A data store 1022 may also be located in the memory device 1020 for storing data related to the modules and other applications along with an operating system that is executable by the processor(s) 1012.

The computing system 1010 of FIG. 10 may be utilized for computing processes, or in a more specific example, for correlating proper nouns across languages and facilitating searches for the proper nouns across languages. For example, the search module 1024 may be used to search for available transliterations to associate with proper nouns, identifications or the like in the data store 1022. The transliteration module 1026 may be used to transliterate proper nouns, search terms and so forth to enable results to be found using the search module 1024.

The computing device 1010 may further include or be in communication with a client device 1030, which may include a display device. The client device 1030 may be available for an administrator to use in interfacing with the computing device 1010, such as to review operation of the system, modify rewards, make improvements to the system and so forth.

Various applications may be stored in the memory device 1020 and may be executable by the processor(s) 1012. Components or modules discussed in this description that may be implemented in the form of software using high programming level languages that are compiled, interpreted or executed using a hybrid of the methods.

The computing device 1010 may also have access to I/O (input/output) devices 1014 that are usable by the computing devices. An example of an I/O device 1014 is a display screen that is available to display output from the computing devices. Other known I/O device may be used with the computing device as desired. Networking devices 1016 and similar communication devices may be included in the computing device 1010. The networking devices 1016 may be wired or wireless networking devices 1016 that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor 1012. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

The system may be used for any of a variety of languages written in any of a variety of different writing systems. The system may be applicable to any of a variety of types of queries, such as author names, actor names, brands, and so forth. Longer fields, such as titles of books, articles, movies and the like may be more challenging but may also work with the present technology.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of correlating a proper noun term across languages, comprising:
    identifying the proper noun term and a proper noun identifier in a first language from a proper noun term data store to be correlated to a second language using a processor;
    determining whether a translation of the proper noun term is available in the proper noun term data store;
    determining whether the translation of the proper noun term is available in a product data store;
    determining whether the translation of the proper noun term is available in a third-party data store;
    translating the proper noun term using transliteration to create the translation when the translation is unavailable;
    identifying a translated noun identifier when the translation is available in the proper noun term data store, the product data store or the third-party data store, or when the translation is available as a result of the translating the proper noun term; and
    assigning the translation to the proper noun term in the product data store by associating the proper noun identifier with the translated noun identifier in a correlation data store.

2. The method of claim 1, wherein transliterating the proper noun term further comprises transliterating the proper noun term to a phonetic representation of the proper noun term.

3. The method of claim 2, further comprising transliterating the phonetic representation of the proper noun term into the second language.

4. The method of claim 1, wherein the proper noun term is at least one of an author name, an actor name, a book title, a movie title, a song title, a brand name, a product name and an artist name.

5. The method of claim 1, further comprising receiving a search request in one of the first or second languages for the proper noun term.

6. The method of claim 1, further comprising transliterating a search term in a search request from the second language to a phonetic representation of the search term for comparison to at least one of the proper noun term or the transliteration of the proper noun term in the first language.

7. A method of correlating a proper noun term across languages, comprising:
    identifying the proper noun term in a first language from a proper noun term data store to be correlated to a second language using a processor;
    identifying a translation associated with the proper noun term, the translation being of the proper noun term from the first language into the second language;
    comparing search trends for the proper noun term and the translation over time;
    determining whether a search trend for the proper noun term approximates a search trend for the translation of the proper noun term to obtain a search trend comparison result; and
    associating the translation with the proper noun term based on the search trend comparison result.

8. The method of claim 7, wherein identifying the translation associated with the proper noun term further comprises identifying whether the translation is available in a proper noun term data store.

9. The method of claim 7, wherein identifying the translation associated with the proper noun term further comprises identifying whether the translation is available in a second data store.

10. The method of claim 9, wherein the second data store is a remote, public data store and the first data store is a local, private data store.

11. The method of claim 7, wherein associating the translation with the proper noun term comprises associating the translation with the proper noun term from a second data store.

12. The method of claim 11, wherein the first data store is a remote, public data store and the second data store is a local, private data store.

13. The method of claim 8, wherein the proper noun term data store includes an identifier for each proper noun term, the method further comprising searching for the proper noun term in a first data store by searching for the identifier.

14. The method of claim 7, further comprising transliterating the proper noun term when the translation is not available.

15. The method of claim 14, wherein transliterating further comprises using a statistical transliteration approach for transliterating proper noun terms.

16. The method of claim 7, further comprising transliterating the proper noun term to a phonetic representation of the proper noun term.

17. The method of claim 16, further comprising transliterating the phonetic representation of the proper noun term into the second language.

18. The method of claim 7, further comprising transliterating the proper noun term to obtain a candidate transliteration and ranking the candidate transliteration of the proper noun term with other candidate transliterations for use in obtaining search results by comparing the search trends of the candidate transliteration and the other candidate transliterations with the search trend for the proper noun term.

19. The method of claim 7, wherein the translation is one of a plurality of transliterations, the method further comprises tracking search frequencies for the plurality of transliterations to identify the search trends and selecting the one of the plurality of transliterations as the translation based on a search frequency for the one of the plurality of transliterations as compared with the plurality of transliterations.

20. The method of claim 7, wherein the proper noun term is at least one of an author name, an actor name, a book title, a movie title, a song title, a brand name, a product name and an artist name.

21. The method of claim 7, further comprising receiving a search request in the second language for the proper noun term.

22. The method of claim 21, further comprising transliterating a search term in the second language to a phonetic representation of the search term for comparison to at least one proper noun term and the translation.

23. A method of correlating proper noun terms across languages, comprising:
- identifying an identifier associated with a proper noun term to be correlated across a plurality of languages from a proper noun term data store using a processor;
- searching for the identifier in a first data store associated with a first language and in a second data store associated with a second language using a correlation data store as an index;
- identifying the proper noun term in the first language from the first data store and the proper noun term in the second language from the second data store based on correlation of the identifier in the first and second data stores from the correlation data store;
- translating the proper noun term into the second language when the translation is unavailable in the second data store; and
- associating the translation with the identifier in the correlation data store.

24. The method of claim 23, further comprising receiving a search request in the second language for the proper noun term and providing search results in the first language.

25. A method of correlating proper noun terms across languages, comprising:
- identifying a proper noun term in a first language from a search query received from a user to be correlated with the proper noun term in a second language using a processor;
- determining whether the proper noun term in the first language is associated with the proper noun term in the second language;
- comparing search trends for the proper noun term and a translation candidate of the proper noun term in the first language over time to determine whether a search trend for the proper noun term approximates a search trend for the translation candidate to obtain a search trend comparison result; and
- providing search results for the translation candidate based on the search trend comparison result.

* * * * *